C. Gregg,
Vise.
N° 10,985.    Patented May 30, 1854.
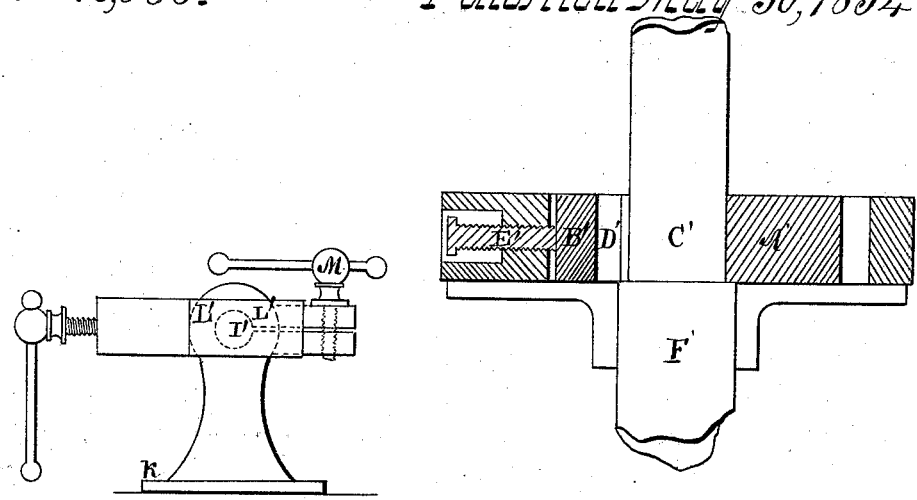
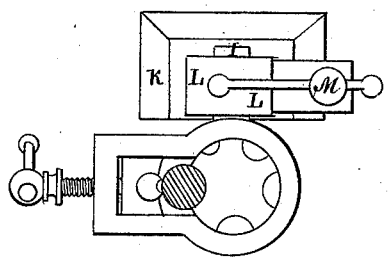
Fig. 2.    Fig. 1
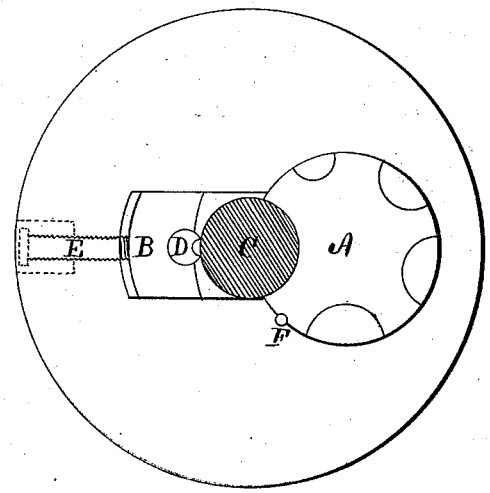
Witnesses
Tho. H. Norris
William H. King
Inventor
Charles Gregg

UNITED STATES PATENT OFFICE.

CHARLES GREGG, OF BROOKLYN, NEW YORK.

VISE OR CHUCK FOR HOLDING CYLINDRICAL BODIES.

Specification of Letters Patent No. 10,985, dated May 30, 1854.

*To all whom it may concern:*

Be it known that I, CHARLES GREGG, of the city of Brooklyn, county of Kings, State of New York, have invented a new and useful Improvement in Chucks and Vises for Holding Cylindrical Bodies; and I declare the following to be a full and accurate description thereof, reference being had to the accompanying drawing and letters of reference marked thereon.

The nature of my invention consists in the formation of the jaws or holding parts of the chuck or vise, the opposite parts being dissimilar; the one for receiving the cylindrical body, the other to keep it in its place and prevent its turning.

Figure 1 represents a plan and section of a chuck. A, A′ is a turning cylinder of metal, having around its circumference several semi-circular recesses for receiving bars or cylinders of different sizes. B, B′ is a piece of metal fitted to the body of the chuck so as to allow of a sliding motion to and from the center. D, D′ is a piece of steel attached to B and having two sharp edges to be brought in contact with the bar or cylinder to be held in the chuck, and by their indentation prevent its turning during any process of manufacture. E, E′ is a screw seated in the body of the chuck, to be used in setting B D, B′ D′ firmly against C, C′, any bar or other body requiring to be held fast.

In applying this device to a vise, the working parts, being the same, require no additional explanation. Instead of being circular, which is convenient in a chuck, it is made oblong; an axis I, I′, Fig. 2, is provided on one side; this is clasped in a socket or box L L, L′ L′, which socket is attached to a plate K, K′, enabling the vise to be attached to a bench and to turn on the axis described, to suit the work required. M, M′, is a screw to tighten the socket upon the axis. The plate K may also itself be fitted so as to revolve around a vertical axis, giving additional facility to the workman.

To adjust the chuck or vise to different sizes of cylindrical bodies, it is merely necessary to turn the circle A and bring to the center the semicircle of the size required. When thus turned, the center of each semicircle coincides with the center of the chuck. The circle A is kept in place when adjusted by a pin F.

If desirable, the circle A may be replaced by others, affording a number and variety of sizes of recesses.

I do not claim a cylindrical die or revolving circle having scores or recesses in its periphery, except when such die is used in combination with another and smaller cylindrical die having a groove cut in its periphery parallel or nearly parallel with its axis which forms two sharp edges that sink into the body to be held when pressed against it by means of the screw and slide as described.

CHARLES GREGG.

Witnesses:
 JOS. M. GREENWOOD,
 THO H. NORRIS.